the wetted mix in a high intensity, low holdup, continuous mixer to form dough.
3,384,036
PROCESS FOR THE CONTINUOUS PREPARATION OF PASTRY DOUGH Clyde Casimir Lawnicki, Milwaukee, Wis., assignor to The Procter & Gamble Company, Cincinnati, Ohio, a corporation of Ohio
No Drawing. Filed Apr. 15, 1965, Ser. No. 448,279
4 Claims. (Cl. 107—54)

ABSTRACT OF THE DISCLOSURE

In the process of preparing pastry dough, the steps of spraying aqueous liquid on a flour-shortening, flaky-crust-providing dry mix layer of predetermined depth and working the wetted mix in a high intensity, low holdup, continuous mixer to form dough.

---

This invention relates to a process for the continuous preparation of pastry dough. This process can be used, for instance, in large commercial bakeries. It also can be used for the commercial production of refrigerated pie dough or in the manufacture of frozen pies and pie crusts.

Pastry doughs are ordinarily prepared in a two-step process. In the first of these steps, conventional amounts of shortening, flour and optional dry ingredients, for example sugar or salt, are blended until a desired mixture is achieved. This blended mixture is referred to as a dry mix. In the second of these steps, water is added to the dry mix resulting from the first step and this combination of ingredients is mixed to form dough. This invention is particularly concerned with the second of these steps.

In the prior art continuous processes, water addition and dough mixing are carried out in a single operation. In these processes, water and dry mix are brought into contact for the first time in a high holdup (long dwell time) continuous mixer, such as a screw conveyor or continuous paddle mixer, and the combination of ingredients mixed to form dough. High holdup continuous mixers are discussed in Perry's Chemical Engineers' Handbook, 4th ed., McGraw-Hill, 1963, at pages 21–43.

These art-recognized continuous processes generally provide dough which is microscopically homogeneous; such dough does not provide a flaky pie crust. The term "flaky" is used herein with respect to pie crust to denote the degree to which crusts are composed of thin laminar friable sheets of baked dough. Flakiness, a crust characteristic esteemed by housewives and bakers, is dependent upon the distribution of shortening in the dough; thus, to some extent discrete lumps of shortening must be preserved in the dough if a flaky crust is to result after baking. These art-recognized processes provide doughs without these desirable discrete lumps of shortening or with a minimum amount of shortening lumps.

In the art-recognized continuous processes for preparing pie crust, "back-mixing" sometimes occurs. In other words, the added ingredients do not move smoothly and uniformly through the mixer; some portions of the materials added to the mixer stay within the mixer for longer periods of time than do others. This back-mixing results in some dough which has been overworked, that is, dough in which the gluten structure has been developed to so great an extent that it provides very tough pie crust. The term "tough" is used to denote difficulty of crust breakage under shear and is opposed to the term "tender." The above described back-mixing can also result in mixer clogging. The excessive mixing together with disproportionate amounts of water can result in sticky dough which does not move through and out of the mixer and eventually clogs the mixer blocking production and necessitating mixer cleanout.

It is an object of this invention to provide a process for the continuous preparation of pastry dough for preparing flaky crusts.

It is a further object of this invention to provide a process for the continuous preparation of pastry dough without back-mixing occurring during dough processing.

Another object of this invention is to provide a process for the continuous preparation of pastry dough, none of which has been overworked during dough mixing.

Yet another object of this invention is to provide a process for the continuous preparation of pastry dough wherein mixer clogging does not occur.

It has been found that pastry dough can be continuously prepared to provide the above advantages of a flaky crust, no back-mixing, no dough overworking and no mixer clogging by a process comprising a specific and separate water addition step and a specific dough mixing step, both of which are essential to these advantages.

Any dry mix that will provide a flaky crust can be formed into a wet mix in the water addition step of the present invention. Such a dry mix is grossly homogeneous. It generally contains from about 25% to about 45% by weight shortening and ordinarily comprises greased flour (that is, flour which is "wetted" by or has absorbed shortening), substantially shortening-free flour and flour-covered shortening in the form of discrete lumps. It is these discrete lumps of shortening which provide the flaky quality. An especially advantageous dry mix for producing flaky pastry crusts comprises by weight from about 10% to about 50% greased flour, from about 5% to about 25% shortening in the form of discrete lumps not exceeding about one-half inch in diameter, and substantially shortening-free flour. Optional dry ingredients and moisture are considered part of the flour.

A dry mix that will provide a flaky crust can be prepared in any number of ways and the particular method of preparation is not critical to the present process. One continuous process for providing a dry mix that provides a flaky crust comprises (1) slicing any commercially available plastic shortening into thin slabs not exceeding about one-half inch in thickness and (2) gently and grossly mixing the shortening slabs together with conventional amounts of flour and optional dry ingredients, e.g., sugar or salt, in a continuous paddle mixer for about one to about 15 minutes until the largest lumps of shortening have diameters not exceeding about one-half inch.

A continuous process for providing a dry mix that provides an especially tender, flaky crust is described in copending application of Edward E. Colby and August Kokal, Jr., Ser. No. 448,313, filed concurrently herewith. This process is exemplified in Example II.

According to the present invention, such a flaky-crust-providing-dry mix is formed into a wet mix by the addition of conventional amounts of water or other aqueous liquid, for example, milk, sugar solution, flavoring and the like in a specially defined manner. The dry mix is first spread out in a layer having a depth ranging from about one-fourth inch to about three-fourths inch. This layering operation can be carried out in any manner deemed convenient, for example by controlling the feed of dry mix onto a moving belt. Aqueous liquid is sprayed more or less uniformly onto the layered dry mix until the added aqueous liquid comprises from about 10% to about 25% by weight of the wetted mix. Ordinarily, aqueous liquid is sprayed onto any one portion of the mix for a period of time ranging from about one to about 10 seconds. Aqueous liquid contact time, that is, the period of time before mixing during which aqueous liquid and dry mix remain in contact and during which aqueous liquid diffuses through the dry mix, generally ranges from about 10 seconds to about three minutes.

If the mix depth is less than about one-fourth inch, the added aqueous liquid tends to pass through holes in the dry mix bed thereby forming puddles and, contrary to this invention, contacts the dry mix for the first time in the dough mixer. If the mix depth exceeds about three-fourths inch, the wetted mix will not form into dough which is grossly homogeneous.

A very small amount of work or mixing energy is added to the wetted mix in a novel and essential mixing step to form dough. Generally, sufficient work is added to enable the substantially shortening-free flour to absorb the added water. Preferably and for optimum results, the amount of work added to the wetted mix in the mixing step is the minimum amount of work necessary for all of the water to be thoroughly absorbed by the substantially shortening-free flour.

The mixer used to add work to the wetted mix is a high intensity, low holdup (short dwell time) continuous mixer. Low holdup continuous mixers are discussed in Perry's Chemical Engineers' Handbook, 4th ed., McGraw-Hill 1963, at pages 21–43. These high intensity mixers supply a large amount of power to a small quantity of material. They supply work to the wetted mix in such a way that changes in stickiness and viscosity and other changes which inevitably accompany the working are not allowed to influence the flow through the mixer.

The preferred high intensity, low holdup continuous mixer is a conventional two-roll mill. In the roll mill the material fed is nipped and continuously drawn down between the rolls where it is subjected to crushing, mixing and abrasion. Roll speed, roll temperature, distance between rolls and number of passes through such a mill are variables.

The distance between rolls of the roll mill cannot exceed about 0.02 inch and the speed of one roll cannot exceed three times that of the other. For optimum results the mill rolls are 0.015 inch apart, roll temperature is 70° F., each roll surface has a speed of 3000 feet per hour, and the wetted mix is passed through the roll mill two times.

Other low holdup continuous mixers which can be used are hammermills and "Entoleters." The hammermills impart crushing and shearing actions to the wetted mix by use of rotating hammers or blades. "Entoleters" are vertical shaft devices in which feed at the shaft is caused to move rotationally and is thrown outward from the rotor to impact on an outer ring. An "Entoleter" is described in Smith U.S. Patent 2,656,988, granted Oct. 27, 1953.

The dough emerging from the low holdup continuous mixer can be used, for example, in a large commercial bakery.

The emerging dough can also be used for refrigerated pie dough. When so used, it can be extruded and cut into cylinder-sized pieces which are dusted with a dusting or separating ingredient, such as rice flour. The dusted cylinder-sized pieces are packaged for later sale.

The dough can also be used, for example, in frozen pie production. When so used, the dough emerging from the mixer is put into convenient form by extruding it through a cylindrical extruding chamber. Cylindrical pieces of extruded dough can be cut from the emerging extruded dough cylinder with a wire-slicer. The extruded dough pieces can be stamped with a conventional stamper or sheeted with a conventional sheeter to form top and bottom crusts. The bottom crust can be placed into a conventional pie pan, the filling added with a filling device, the top crust set into place and the top and bottom crusts crimped or sealed together for example by pressure from a downwardly descending metal ring. The pies are then ready for packaging, refrigeration and sale.

The following examples wherein all parts and percentages are by weight are illustrative of the present invention and are not to be construed in any way as limiting the scope of the invention.

EXAMPLE I

Pastry dough was made up from the following proportions of ingredients:

| | Parts |
|---|---|
| Flour (containing about 13% moisture) | 52.43 |
| Shortening [1] | 33.96 |
| Salt (sodium chloride) | 1.25 |
| Added water | 12.36 |

[1] The shortening used in this example was a commercial plastic shortening having an I.V. of about 50 and comprised hydrogenated soybean and cottonseed oils.

High quality hard wheat flour containing 13% moisture was premixed with salt in a ribbon mixer in proportions of 42 to 1, flour to salt.

The salt-flour premix was gravimetrically fed at a rate of 2.07 lbs./minute into a twin-shaft continuous paddle mixer. Discs of shortening having a 1.5 inch diameter and one-eighth inch thickness were simultaneously fed into this same mixer at the rate of 1.3 lbs./minute.

The twin-shaft continuous shallow paddle mixer was 48 inches in length. The shafts were counter-rotating, each turning at a speed of 35 r.p.m. The paddles extended from each shaft. They were located at intervals along the lengths of the shafts and were synchronized to intermesh in the central portion of the mixer; some of the paddles extended perpendicularly from the shafts at an angle of 0° to a plane perpendicular to the shaft axis and part of the paddles were pitched, the pitched paddles providing conveying or transporting means for the mixed material and the other paddles providing size reduction and mixing action.

In the mixer the shortening and flour-salt premix were gently and grossly mixed, the mixer residence time for any portion of the mix averaging about eight minutes.

A glossy homogeneous dry mix containing greased flour, substantially shortening-free flour and shortening lumps ranging up to about one-fourth inch in diameter resulted.

The dry mix emerging above was gravity fed onto a moving belt so as to form a bed of dry mix having a thickness of five-eighths inch. Water was sprayed downwardly and more or less uniformly onto the moving mix until added water comprised 12.36% of wetted mix. The water was sprayed onto any one portion of the mix for about two seconds. The water and dry mix were allowed to remain in contact before mixing for a time period of about 40 seconds, this time period being the aqueous liquid contact time.

The wetted mix was doctored from the moving belt by a blade and fed into a dough mixer at the rate of about 228 lbs./hr.

The dough mixer used herein was a conventional two-roll mill with distance between rolls being 0.015 inch; roll temperature, 70° F.; each roll surface had a speed of 3000 feet per hour. The material emerging from the roll mill was fed into another such two-roll mill. In both roll mills the mixed material was doctored from the rolls by blades. The dough which emerged from the second roll mill can be used in commercial bakeries for preparing pie shells or similar type products or for refrigerated pie dough or in frozen pie production to provide a flaky crust. No back-mixing occurred during the above processing.

The pastry dough was not overworked and there was no mixer clogging.

EXAMPLE II

Pastry dough was made up from the following proportions of ingredients:

| | Parts |
|---|---|
| Shortening [1] | 32.3 |
| Flour containing about 14% moisture | 50.4 |
| Salt (sodium chloride) | 1.3 |
| Added water | 16.0 |

[1] The shortening used in this example was made up from the following proportions of ingredients: hydrogenated cottonseed oil (I.V. equal to 8), 7.5 parts; partially hydrogenated cottonseed oil (SCI at 70° F. equal to 22), 10.8 parts; partially hydrogenated soybean oil (SCI at 70° F. equal to 5), 81.7 parts; butylhydroxyanisol, 30 p.p.m.; carotene, 38 p.p.m.

The shortening composition components were mixed together in a liquid or melted condition and the melted shortening rapidly chilled to 60° F. by passing through a scraped wall heat exchanger.

The chilled shortening while still in a liquid condition was pumped by a gear pump into an 8.5 foot long, 1.5 inch diameter hold tube wherein the shortening solidified and was allowed to firm to a penetration of about 70 mm./10.

The firmed shortening was pumped from the hold tube. As the shortening emerged from the tube, it was sliced into cylindrical discs of one-eighth inch thickness by a rotating blade and the discs fell at the rate of 1.3 lbs./min. into a mixer to be described hereinafter.

High quality hard wheat flour was premixed with salt in proportions of about 39:1 (the flour being on a 14% moisture-containing basis) in a ribbon mixer. The flour-salt premix was gravimetrically fed at the rate of 2.07 lbs./min. into the same mixer with the shortening.

The shortening and premix were fed into the continuous shallow paddle mixer described in Example I. The shafts turned at a speed of 35 r.p.m. In the mixer the shortening and flour-salt premix were gently and grossly mixed, the mixer residence time for any portion of the mix averaging about 6.5 minutes. The largest shortening particles in the emerging mix were about one-fourth inch in diameter.

The mix emerging from the paddle mixer was fed by a moving belt into a hammermill. In the hammermill the ingredients were gravity fed onto a set of rotating blades whereby the ingredients were mixed and some of the shortening particles size-reduced. In the hammermill the ingredients were intensely mixed for about one second with a mill speed of 1200 r.p.m. The total number of impacks per pound of mix was about 6000.

The dry mix emerging from the hammermill contained 38.5 parts shortening, 60.0 parts flour containing 14% moisture and 1.5 parts salt. The mix contained 40% substantially shortening-free flour, 20% free shortening and 40% greased flour. With respect to these percentages salt and moisture are considered a part of the flour. The free shortening is present in the form of discrete lumps having diameters ranging up to one-fourth inch.

The dry mix was fed onto a moving belt and sprayed with water as in Example I except that the water was added so as to provide 16 parts of added water per 100 parts of wetted mix. The wetted mix was mixed into dough at the rate of about 240 lbs./hr. by two roll mills in series, as in Example I. The dough emerging from the second roll mill can be used in a commercial bakery for preparing pie shells or for refrigerated pie dough or in frozen pie production. This dough provides an especially tender, flaky crust. No back-mixing occurred during the above processing. The pastry dough was not overworked and there was no mixer clogging.

Substantially similar results to Example I or II can be achieved with high intensity, low holdup mixers other than the roll mill. For example, substantially similar results to those achieved with a roll mill can be achieved with a hammermill or an "Entoleter."

What is claimed is:
1. In the process for the continuous preparation of pastry dough, the steps comprising:
   (A) continuously spraying aqueous liquid on a flour-shortening, flaky-crust-providing dry mix layer of predetermined depth in amounts ranging from about 10% to about 25% by weight of wetted mix, the mix depth ranging from about one-fourth inch to about three-fourths inch; and
   (B) adding sufficient work to the wetted mix resulting from step (A) in a high intensity, low holdup continuous mixer to form dough.
2. The process of claim 1 wherein the work added in step (B) is the minimum amount necessary for all of the water to be thoroughly absorbed by the flour.
3. The process of claim 1 wherein the aqueous liquid is allowed to contact the dry mix before dough mixing over a period of time ranging from about 10 seconds to about three minutes.
4. The process of claim 1 wherein work is added to the wetted mix in a conventional two-roll mill.

References Cited

UNITED STATES PATENTS

| | | | |
|---|---|---|---|
| 2,516,436 | 7/1950 | Walker | 259—4 |
| 2,703,059 | 3/1955 | Kaser | 107—54 |
| 2,996,022 | 8/1961 | McCashen | 107—54 |
| 3,296,982 | 1/1967 | Zang | 107—30 |

WALTER A. SCHEEL, *Primary Examiner.*

J. SHEA, *Assistant Examiner.*